US006052495A

United States Patent [19]
Little et al.

[11] Patent Number: 6,052,495
[45] Date of Patent: Apr. 18, 2000

[54] RESONATOR MODULATORS AND WAVELENGTH ROUTING SWITCHES

[75] Inventors: Brent E. Little, Boston, Mass.; James S. Foresi, Albuquerque, N. Mex.; Hermann A. Haus, Lexington, Mass.

[73] Assignee: Massachusetts Institute of Technology, Cambridge, Mass.

[21] Appl. No.: 08/944,009

[22] Filed: Oct. 1, 1997

[51] Int. Cl.[7] .................................................. G02B 6/293
[52] U.S. Cl. .................................. 385/2; 385/24; 385/27; 385/32; 385/40; 385/50
[58] Field of Search .................................... 385/1, 2, 8, 9, 385/14, 24, 27, 32, 39–41, 47, 50, 131, 132

[56] References Cited

U.S. PATENT DOCUMENTS

| 3,558,213 | 1/1971 | Marcatili | 385/132 |
|---|---|---|---|
| 3,589,794 | 6/1971 | Marcatili | 385/42 |
| 3,963,998 | 6/1976 | Richter | 333/211 |
| 4,097,826 | 6/1978 | Knox et al. | 333/202 |
| 4,282,499 | 8/1981 | DeFonzo | 333/231 |
| 4,630,885 | 12/1986 | Haavisto | 385/30 |
| 4,695,121 | 9/1987 | Mahapatra et al. | 385/40 |
| 4,720,160 | 1/1988 | Hicks, Jr. | 385/31 |
| 5,158,908 | 10/1992 | Blonder et al. | |
| 5,457,760 | 10/1995 | Mizrahi | 385/37 |
| 5,526,153 | 6/1996 | Glance | 359/127 |
| 5,790,583 | 8/1998 | Ho | 372/92 |
| 5,825,799 | 10/1998 | Ho et al. | 372/92 |
| 5,878,070 | 3/1999 | Ho et al. | 372/92 |

FOREIGN PATENT DOCUMENTS

| 2703473 | 10/1994 | France | G02B 5/28 |
|---|---|---|---|
| WO 98/53535 | 11/1998 | WIPO . | |

OTHER PUBLICATIONS

Little et al., "Microring Resonator Channel Dropping Filters," *Journal of Lightwave Technology*, vol. 15 No. 6 (Jun. 1997):998–1005.

Zhang et al., IEEE Photonics Technology Letters, "Directional Light Output form Photonic–Wire Microcavity Semiconductor Lasers", vol. 8, No. 8, pp. 968–970, Aug. 1996.

Adar et al., Applied Phys. Lett., "Measurement of very low–loss silica on silicon waveguides with a ring resonator", vol. 58, No. 5, pp. 444–445, Feb. 4, 1991.

Little, et al., IEEE Lasers and Electro–Optics Society 1995 Annual Meeting (8th Annual Meeting), "Micro–Ring Resonator Channel Dropping Filters", Conference Proceedings vol. 2, pp. 233–234, Oct. 30–Nov. 2, 1995.

*Primary Examiner*—John D. Lee
*Assistant Examiner*—Michael J. Stahl
*Attorney, Agent, or Firm*—Samuels, Gauthier & Stevens, LLP

[57] ABSTRACT

The invention provides an optical switch and modulator which uses a closed loop optical resonator. The optical resonator is a dielectric cavity whose primary function is to store optical power. Various structures are possible, and a particularly advantageous one is a ring shaped cavity. The wavelength response at the output port of a ring resonator side coupled to two waveguides is determined by the details of the resonator, and the coupling between the resonator and the waveguides. By coupling to adjacent resonators, the modulator response can be improved over that of a single resonator. One such improvement is in modulator efficiency, which is defined as the ratio of the change in optical intensity at the output, to a change in absorption in the ring waveguides. Absorption is used for switching and modulation without incurring significant optical attenuation. Another improvement involves making the resonance insensitive to small deviations in wavelength or index change. The latter improves fabrication tolerances and compensates for possible drift of the signal wavelength. Collectively, the behavior of multiple coupled resonators yields higher order responses.

20 Claims, 7 Drawing Sheets

R: RING RADIUS
$\lambda_i$: WAVELENGTH CHANNELS
$n_{co}$: CORE INDEX
$n_{cl}$: CLADDING INDEX

| N | MAXIMALLY FLAT |
|---|---|
| 2 | $\mu_1^2 = 0.250 \mu^4$ |
| 3 | $\mu_1^2 = \mu_2^2 = 0.125 \mu^4$ |
| 4 | $\mu_1^2 = \mu_3^2 = 0.100 \mu^4$ <br> $\mu_2^2 = 0.040 \mu^4$ |
| 5 | $\mu_1^2 = \mu_4^2 = 0.0955 \mu^4$ <br> $\mu_2^2 = \mu_3^2 = 0.0295 \mu^4$ |
| 6 | $\mu_1^2 = \mu_5^2 = 0.0915 \mu^4$ <br> $\mu_2^2 = \mu_4^2 = 0.0245 \mu^4$ <br> $\mu_3^2 = 0.0179 \mu^4$ |

RESONATOR MODULATORS AND WAVELENGTH ROUTING SWITCHES

SPONSORSHIP INFORMATION

This invention was made with government support under Grant No. 9400334DMR awarded by the National Science Foundation and Contract No. MDA972-94-1-0001 awarded by the Advanced Research Projects Agency. The government has certain rights in the invention.

BACKGROUND OF THE INVENTION

The invention relates to optical modulators and switches which utilize closed loop resonators.

Optical communications has become the prevailing technology for long haul communications, and is now making tremendous inroads into local communications networks, local area loops, and distributed computing. The domination of optics has transpired due to the higher bit rates, lower distortion, and lower loss possible using fiber optics compared with that using any form of electrical transmission. However, information transducers such as telephones, video cameras, computers, and the like have their information content originating in electronic format. These electrical signals must be converted to optical modulation before being transmitted. In addition, once in optical form, these signals must be switched and routed through the optical network to arrive at their final destinations. Thus, devices which perform this electro-optical conversion and optical routing are fundamentally required in any optical communications system.

FIGS. 1A and 1B are schematic diagrams of the basic principles of modulators and switches, respectively. Optical modulators, such as optical modulator 100, are the devices which perform the task of impressing onto a lightwave signal, information carried by an electrical signal. Optical switches or routers on the other hand, such as optical switch 110, are the devices which provide a means of diverting an input optical signal to one of a number of possible output ports, thus redirecting a signal according to its intended destination. Some devices can be used in both capacities. Modulators and switches are controlled by an electrical signal. In the case of the modulator 100, a waveform 102 of the electrical signal is to be reproduced on the optical input signal 104 to produce an optical output signal 106. In the routing switch 110, the electrical signal 112 is used as a control line, which establishes the creation of the desired path between input 114 and output 116 ports.

There are four widely accepted performance criteria by which the merits of modulators and switches may be standardized. They are as follows: (1) Modulation Depth, or ON/OFF contrast, which is the ratio of minimum to maximum swing in optical power achievable; (2) Cross-talk, which is the fraction of input power unintentionally coupled to a specific output port, when that port is not selected by the switch; (3) Modulation Bandwidth, which is related to the maximum modulation frequency at which the device may operate (typically the bandwidth is limited by the electrical layer due to electrode capacitance, but may be also limited by the wavelength selectivity of the optical layer); and (4) Electrical power consumption, which involves both the power to switch and the power to hold a given (ON/OFF) state.

Four of the more promising modulator and switching schemes proposed and demonstrated to date are shown in FIGS. 2A–2D. Those devices which modulate based on an induced index change are classified as electrooptic modulators, while those which make use of absorption are called electro-absorption modulators. The simplest scheme makes use of directly modulating a laser as shown by the modulator 200 in FIG. 2A, which is a form of electro-absorption modulation. FIG. 2B shows a Mach-Zehnder interferometer modulator 202. FIG. 2C shows an acoustooptic modulator 204 which can also serve as an optical switch. FIG. 2D shows a basic electro-absorption modulator 206.

The primary limitation of all the preceding modulation devices is their relatively long lengths. This is especially true of electrooptic modulators, (FIGS. 2B and 2C), as the induced index change is small, and significant effects are only accumulated over long propagation distances. The associated long electrodes create large capacitance which limits high frequency modulation.

Furthermore, in communications systems a switching substation may require hundreds to thousands of switches, all of which are interconnected. The large size of currently proposed switches means that at most a few devices can be interconnected on a single chip. The remaining majority will have to be interconnected as discrete components. This increases the cost, size, and power consumption, and decreases the performance to such an extent that the benefits of optical switching may no longer outperform electrical domain switching. Electro-absorption modulators can be shorter and more efficient than electrooptic modulators. However, all electro-absorption modulators proposed to date (which are variants of FIG. 2D), absorb the optical power, and therefore can not be used as switching elements.

It is therefore an object of the invention to provide a novel device which can make use of absorption to switch or modulate an optical signal, without incurring significant signal attenuation. It is also an object of the invention to utilize a resonator, which recirculates the optical power, thus making the device size several orders smaller than those proposed to date.

SUMMARY OF THE INVENTION

The invention provides an optical switch and modulator which uses a closed loop optical resonator. The optical resonator is a dielectric cavity whose primary function is to store optical power. Various structures are possible, and a particularly advantageous one is a ring shaped cavity. The wavelength response at the output port of a ring resonator side coupled to two waveguides is determined by the details of the resonator, and the coupling between the resonator and the waveguides. By coupling to adjacent resonators, the modulator response can be improved over that of a single resonator. One such improvement is in modulator efficiency, which is defined as the ratio of the change in optical intensity at the output, to a change in absorption in the ring waveguides. Absorption is used for switching and modulation without incurring significant optical attenuation. Another improvement involves making the resonance insensitive to small deviations in wavelength or index change. The latter improves fabrication tolerances and compensates for possible drift of the signal wavelength. Collectively, the behavior of multiple coupled resonators yields higher order responses.

Accordingly, in one embodiment the invention provides a signal modulator including an input waveguide which carries a signal having a plurality of wavelengths including a desired wavelength; an output waveguide; and a closed loop resonator coupled between the input and output waveguides which allows transmission of the plurality of wavelengths except the desired wavelength through the input waveguide, the resonator being operable for selectively transferring the desired wavelength to the output waveguide in response to absorption characteristics of the resonator being varied.

DETAILED DESCRIPTION OF THE ILLUSTRATED EMBODIMENTS

The invention as described herein utilizes optical absorption to route or modulate an optical signal. Absorption is conventionally associated with signal attenuation. However, the novelty of the present scheme is that absorption is used without incurring significant attenuation. Instead, it is simply used as a means to suppress a resonance.

Figure 1A:
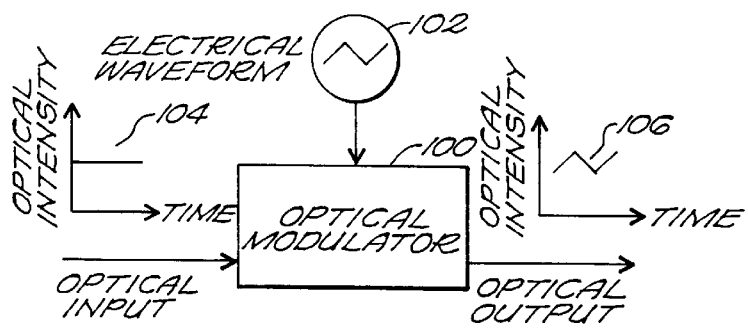
FIGS. 1A and 1B are schematic diagrams of conventional optical modulation and optical switching techniques, respectively.
Figure 1B:
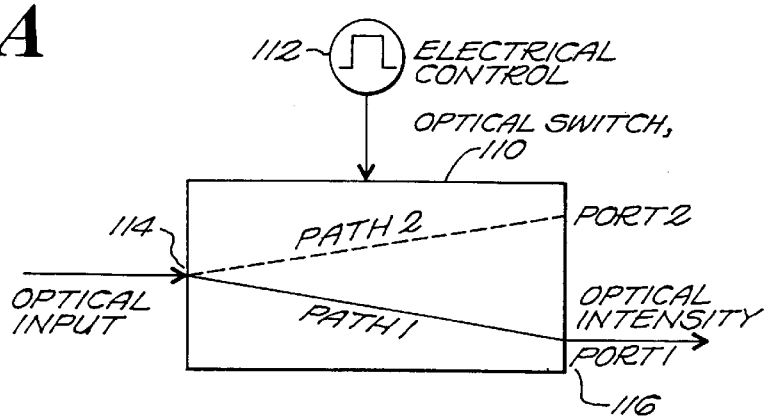
Figure 2A:
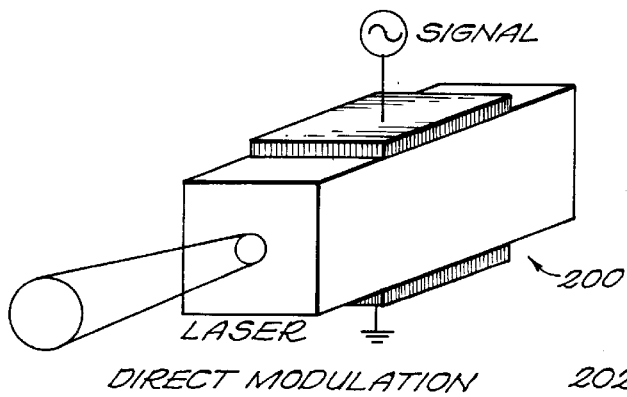
FIGS. 2A–2D are schematic diagrams of several conventional optical modulation and switching devices.
Figure 2B:
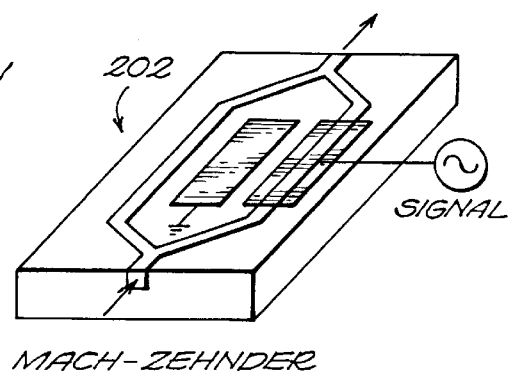
Figure 2C:
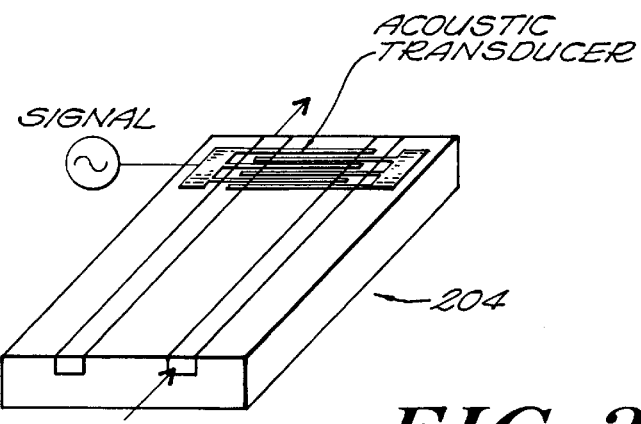
Figure 2D:
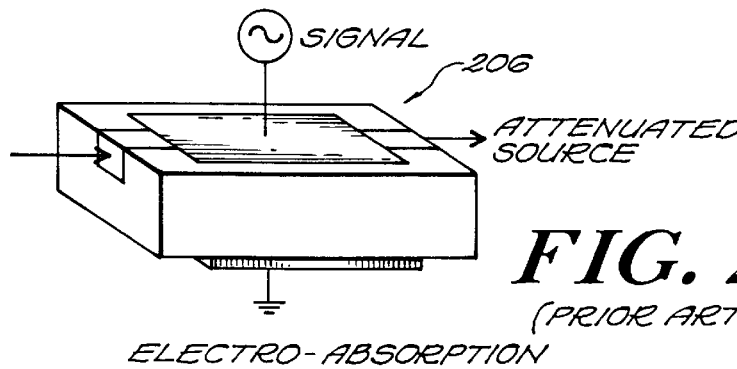
Figure 3:
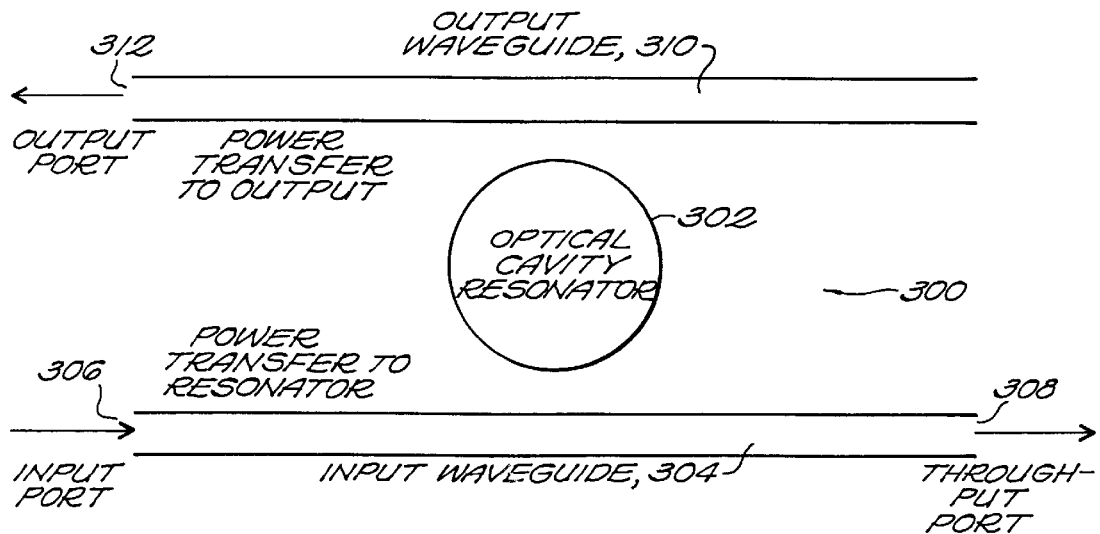
FIG. 3 is a schematic diagram of an exemplary router/modulator device which uses a resonator to switch power from an input waveguide to an output waveguide.

The principle of operation of the invention is depicted in schematic diagram of FIG. 3. The basic routing/modulating structure 300 consists of an optical cavity 302 that is weakly coupled to two waveguides. One guide serves as an input waveguide 304 having an input port 306 and a throughput port 308. The other guide, also weakly coupled to the cavity, but not to the input waveguide, serves as an output waveguide 310 and has an output port 312. The signal to be modulated or switched is applied to the input port 306. The cavity 302 supports resonances at a number of wavelengths, which are determined by the geometrical details and refractive index distribution of the cavity.

At these special resonant wavelengths, optical power fed into the resonator from the side coupled input waveguide 304 circulates in the resonator and builds up to large intensities. (An analogy is the swinging pendulum: small taps on the pendulum arm, if appropriately timed, lead to increasingly large swings.) Energy in the cavity at resonance also couples to the output waveguide 310. At a resonant wavelength, and if the ring is non-absorbing, it can be shown that all of the power present at the input can be transferred to the output port 312. On the other hand, when the cavity is made highly absorbing, resonance is inhibited at all wavelengths. In this case, power at the input port bypasses the cavity and exits the throughput port. Thus, by allowing or inhibiting cavity resonances through absorption, an optical signal can be switched between two ports.

The foregoing is a description of optical switching or routing, where ideally the input power is completely diverted to one port or the other. Optical modulation is more general, and implies that the output optical signal level can be adjusted to any fraction of the input level. This arrangement is possible in the switching device of the invention. The fraction of power switched between the output ports depends on the degree of resonator absorption. For the case of no absorption, power is switched to the output port. For sufficiently large absorption, power exits the throughput port. For intermediate values of absorption, power is partially switched between ports. Thus, considering either one of the output ports as the "modulator output", the level of optical intensity may be modulated by the degree of resonator absorption.

Figure 4:
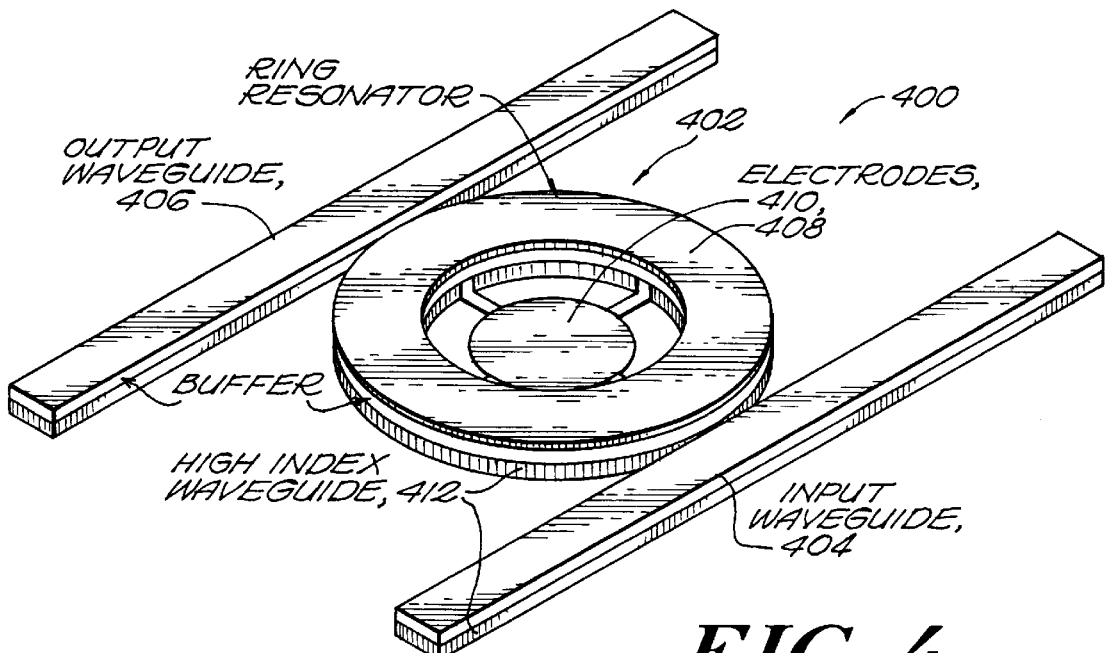
FIG. 4 is a perspective view of an exemplary micro-ring resonator modulator/switch in accordance with the invention.

With reference now to FIG. 4, there is shown a perspective view of an exemplary micro-ring resonator modulator 400 in accordance with the invention. The modulator 400 consists of a single ring resonator 402 side coupled to two adjacent waveguides, an input waveguide 404 and an output waveguide 406. The modulator also has a pair of electrodes 408 and 410 to transmit an electrical signal, in the form of voltage or current, to the ring resonator.

Figure 5:
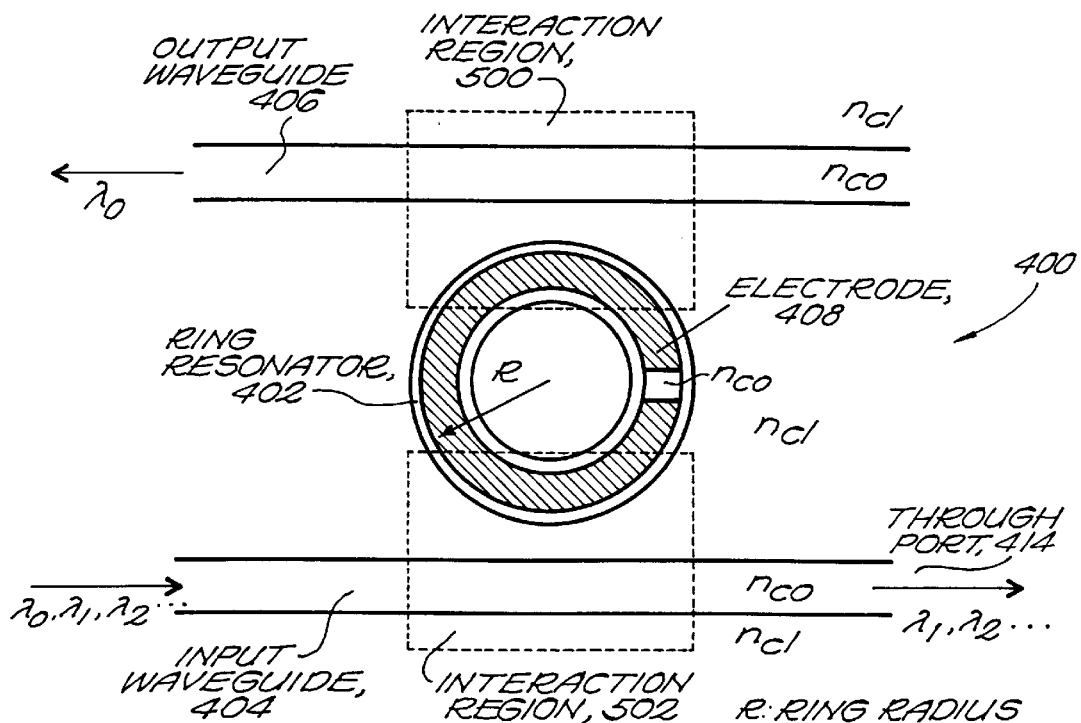
FIG. 5 is a plan view of the ring-resonator modulator/switch of FIG. 4.

FIG. 5 is a top plan view of the modulator 400 depicted in FIG. 4. Referring to FIG. 5, the ring resonator 402, comprises a waveguide with a higher index material in the core ($n_{co}$), surrounded by a lower index material for the cladding ($n_{cl}$), to produce a high confinement waveguide 412, which is fashioned into a closed path, here called a ring. The input waveguide 404 is placed in close proximity to the ring 402 in order to interact with the resonator mode. The input waveguide transports an optical signal to be modulated by the ring, or serves as a signal bus carrying numerous optical wavelengths, one of which is to be selectively switched by the ring.

The output waveguide 406 is also placed within interacting distance of the ring. This waveguide serves as the output port of the switch. The pair of electrodes 408 and 410 are placed on, or in close proximity, to the ring 402. These electrodes are connected to an electrical signal source (not shown), and are used to induce absorption in the ring waveguide. Power in this device is nearly conserved, so that any fraction of input power not transferred to the output waveguide, appears at a through port 414. A more detailed description of the physical operation of the device, and of preferable parameter selection is provided hereinafter.

A high confinement, or high index contrast, waveguide is essential for the micro-ring structure, allowing low propagation loss around the sharp bends of the small rings. High optical mode confinement is realized by using a large index contrast between the waveguide core material ($n_{co}$), and the surrounding cladding material ($n_{cl}$), particularly in the horizontal plane of the rings where bending takes place. The waveguide core is a channel waveguide composed of high index material such as silicon (Si, index of 3.5), or III–V semiconductor (index values near 3.0), surrounded by low index cladding material, such as oxide ($SiO_2$, index of 1.5) or air (index of 1.0). In general the appropriate selection of materials is limited to those which manifest an electro-absorption effect.

Referring again to FIG. 5, the detailed structure of the waveguide composing the ring 402, in conjunction with the radius of the ring R, is selected so as to achieve a resonant condition for the particular wavelength to be modulated or switched. This wavelength will be denoted as $\lambda_o$. The resonant condition is given explicitly by the formula $$\lambda_0 = \frac{2\pi R n_e}{M}, \quad (1)$$

where $n_e$ is the so called effective index of the mode in the ring waveguide, and which can be calculated precisely by well known methods, R is the ring radius measured from the ring center to the middle of the ring waveguide, and M is an integer value.

The separation between the ring 402 and the input waveguide 404, and between the ring and the output waveguide 406, determines the degree of interaction between the modes travelling along the waveguides and the ring resonator mode. The magnitude of this interaction is an important device parameter which governs both the optical bandwidth of the resonator, and the switching or modulation efficiency. The optical bandwidth is the range of wavelengths that are allowed to pass unattenuated from the input waveguide to the output waveguide via the ring. The switching or modulation efficiency is the ratio of the change in optical intensity at the output, to a change in absorption induced in the ring waveguide.

The interaction is explicitly calculated as the fraction of power coupled from the input waveguide to the ring, over the associated mutual interaction regions 500 and 502. This fraction of power is denoted by $\kappa^2$, and the resulting optical bandwidth, denoted by $\Delta\lambda$, is given by the formula, $$\Delta\lambda = \frac{\kappa^2 \lambda_o^2}{2\pi^2 R n_e}. \quad (2)$$

It will be appreciated that the degree of interaction between the output waveguide and the ring must also be chosen to be equal to that between the input waveguide and ring, that is also $\kappa^2$.

A measure of the switching or modulation efficiency of the ring may be found by calculating the required degree of induced absorption needed to reduce the output intensity to half of its on-resonance value. This change will be denoted as $\Delta\alpha$ (which has units of nepers/m), and is given by $$\Delta\alpha = \frac{\kappa^2}{2\pi R}. \quad (3)$$

Smaller values of $\Delta\alpha$ imply greater efficiency. It is thus evident from equation (3) that the efficiency can be increased by reducing $\kappa^2$, the interaction strength. This is accomplished by moving the input and output waveguides farther from the ring. However, in reducing $\kappa^2$ the optical bandwidth must be kept large enough to accommodate the bandwidth of the highest electrical frequencies. This places a lower limit on $\kappa^2$, as determined by the relation of $\Delta\lambda$ and $\kappa^2$ in equation (2). This is a fundamental relationship between efficiency and bandwidth, which can be expressed by writing $\Delta\alpha$ in terms of $\Delta\lambda$ $$\Delta\alpha = \frac{\Delta\lambda}{\lambda_o^2} \pi n_2. \quad (4)$$

The largest efficiency (smallest value $\Delta\alpha$) is determined by the smallest optical bandwidth $\Delta\lambda$ which will accommodate the electrical modulation. Efficiency can be increased without sacrificing bandwidth by using multiple rings.

Figure 6A:
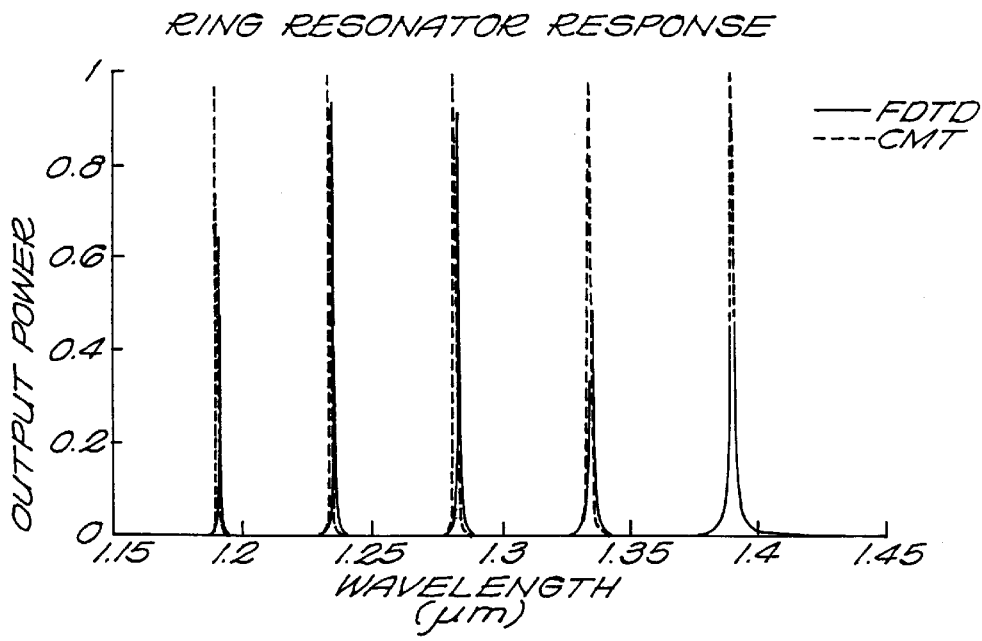
FIG. 6A is a graph of a typical wavelength response of a single ring resonator.
Figure 6B:
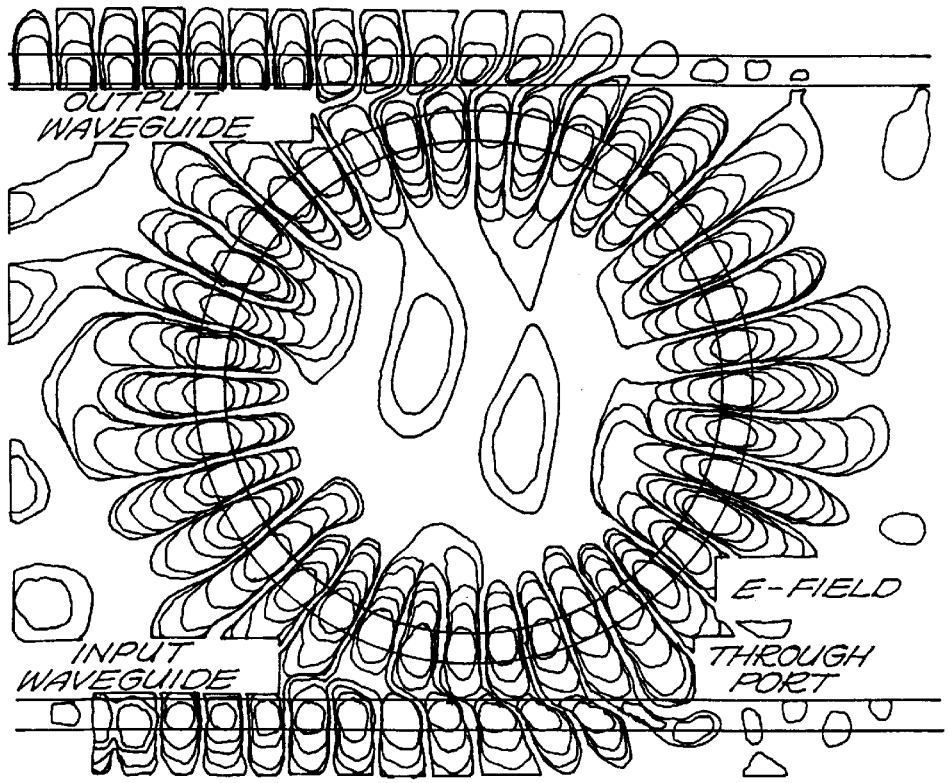
FIG. 6B is the instantaneous electric field distribution in the resonator at resonance.

The wavelength response at the output port of a single ring resonator side coupled to two waveguides is shown in the graph of FIG. 6A. Each peak corresponds to a resonant wavelength of the ring. The width of each peak, the wavelength spacing between peaks, and the precise resonant wavelength, are determined by the details of the resonator, and the coupling between the resonator and the waveguides. The electric field distribution at resonance inside the device, as calculated by a numerically rigorous simulation, is plotted in FIG. 6B.

Figures 7, 8:
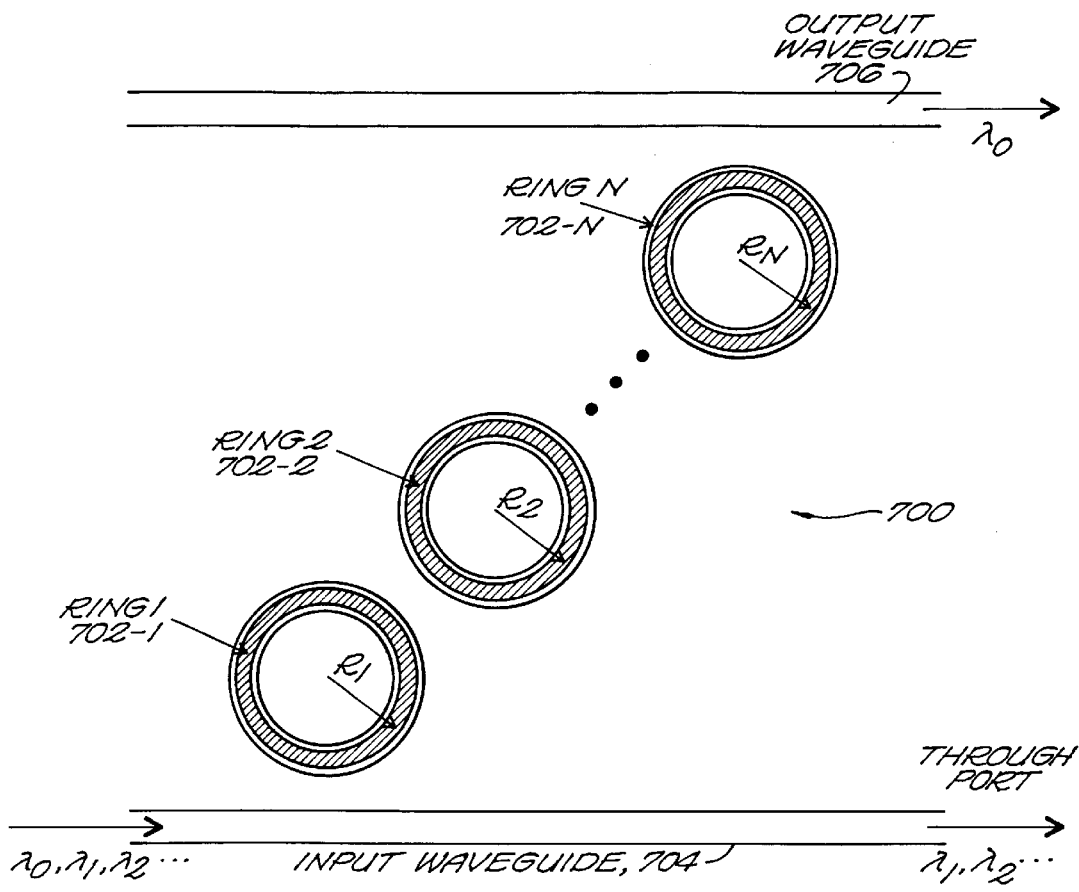
FIG. 7 is a plan view of multiply coupled ring resonators operating as higher-order modulators.
FIG. 8 is a table showing the necessary relationships to achieve Maximally Flat response for configurations of from two to six rings.

So called higher-order responses are realized by the coupling of multiple rings, as depicted in FIG. 7. The use of multiple rings can increase the switching or modulation efficiency and improve the shape of the resonant response in the wavelength domain. By improving the modulation efficiency, less induced absorption is required to obtain a certain change in output intensity. This translates into smaller voltage and power requirements for the electrical signal source. The resonant shape is improved by making the modulators wavelength response flat. The flat response translates into less sensitivity of the output intensity to drifts in the optical carrier wavelength.

Referring now to FIG. 7, there is shown a top plan view of an exemplary higher-order modulator 700 having N rings, wherein ring-n is coupled only to its immediate neighbors, ring-(n−1) and ring-(n+1). The outermost rings, ring-1 702-1, and ring-N 702-N, are coupled to an input waveguide 704, and to an output waveguide 706, respectively, in a similar manner as that depicted for the single ring in FIG. 5. All rings must have in common a resonant condition existing at the particular wavelength of interest, $\lambda_o$. The resonant condition for each ring is given by equation (1), where the ring radius R and the integer value M, may differ for each ring. The specific design of higher order modulators is now described.

The most desirable modulator response is one which achieves a flat wavelength response and largest modulation efficiency. Such a response is known as "Maximally Flat" in electrical circuit design. Using a novel approach described in Little et. al. "Microring resonator optical channel dropping filters", J. of Lightwave Technology, vol. 15, pp. 998–1005, 1997, incorporated herein by reference, higher-order ring resonator filters may be analyzed analytically. By using the analytic approach, universal formulas have been synthesized to determine the most favorable configurations involving arbitrary numbers of rings, to obtain Maximally Flat response. These universal formulas are now described.

Referring again to FIG. 7, let the fraction of power coupled from the input waveguide 704, to ring-1 702-1, over their mutual interaction region (region 502 of FIG. 5), be denoted by $\kappa^2$. The fraction of power coupled from the output waveguide 706, to the last ring, ring-N 702-N, also has the value $\kappa^2$. Let $\kappa_1^2$ be the fraction of power coupled between ring 702-1 and ring 702-2, and likewise in general let $\kappa_n^2$ be the fraction of power coupled between ring-n and ring-(n+1). The following quantities are also defined in terms of $\kappa^2$ and $\kappa_n^2$, $$\mu^2 = \frac{\kappa^2 v_g l}{2\pi R_1} \quad (5)$$

$$\mu_n^2 = \frac{\kappa_n^2 v_{gn} v_{gn+1}}{(2\pi)^2 R_n R_{n+1}} \quad (6)$$

where $v_{gn}$ is the group velocity of the mode in ring-n, and $R_n$ is the radius. The group velocity is a well known quantity which can be found from knowledge of the effective index of the mode and wavelength.

To achieve Maximally Flat response, the selection of the quantities $\mu_n^2$ relative to $\mu^2$ are made according to the relationships outlined in the table of FIG. 8, which shows the results for from two to six rings. The formulas in the table are universal, as no explicit details of the waveguide structure or ring parameters enter.

Figure 9:
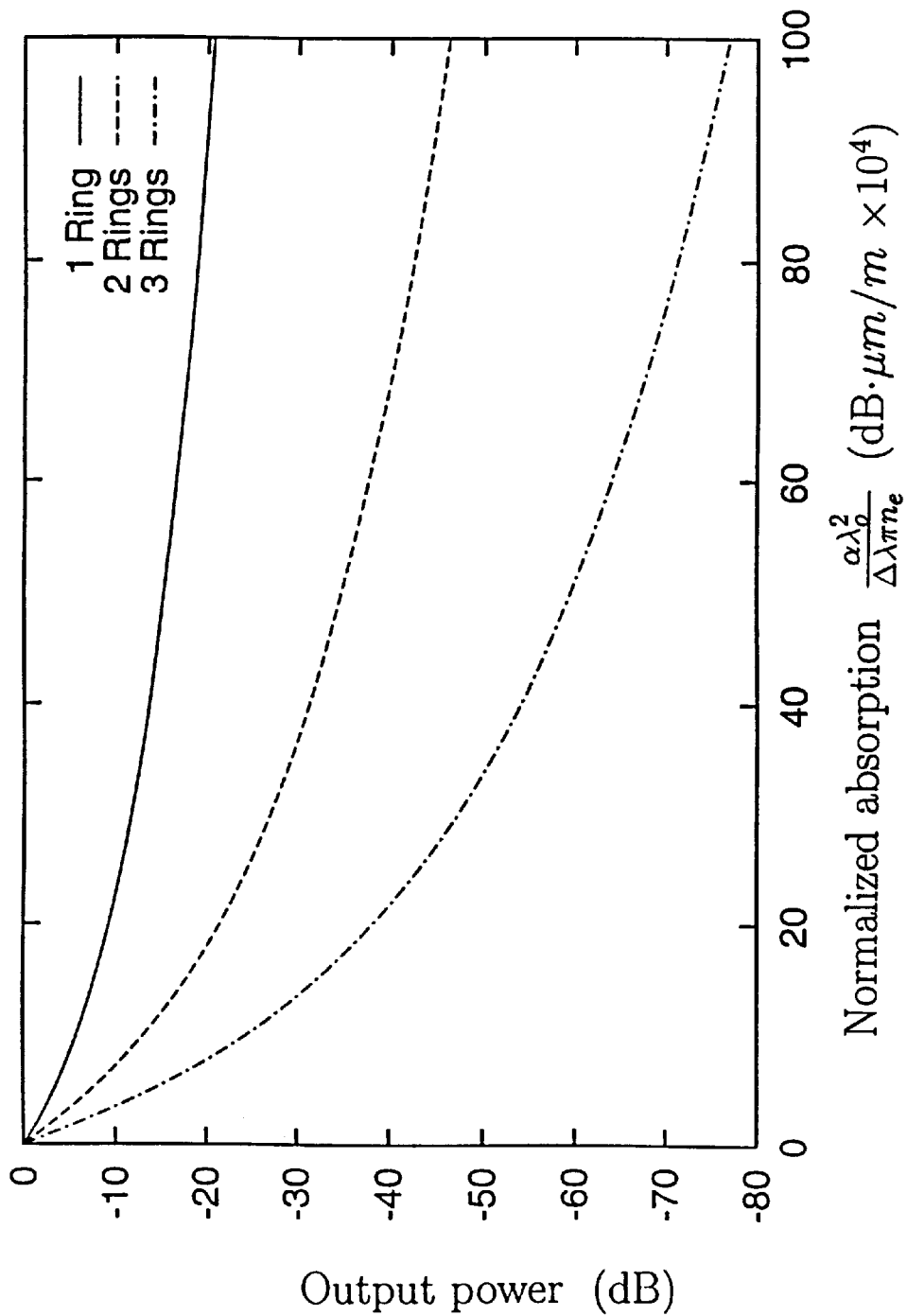
FIG. 9 is a graph of the typical response of higher-order modulators achieved through multiply coupled rings as in FIG. 7.

Examples of higher-order electro-absorption responses constructed with the help of the design formulas in the table of FIG. 8, are shown in the graph of FIG. 9. FIG. 9 plots the response of an electro-absorption ring modulator for cases of 1,2, and 3 coupled rings. The abscissa in this figure is in terms of the normalized absorption coefficient $\alpha\lambda_o^2/\Delta\lambda\pi n_e$, which has units of dB·m/cm. $\alpha$ is the actual absorption coefficient in dB/cm, $\lambda_o$ is the wavelength of the optical signal in $\mu$m, $\Delta\lambda$ is the optical bandwidth of the modulator in $\mu$m, and $n_e$ is the effective index of the ring waveguide mode. The ordinate is the output power in decibels.

At zero absorption, the output intensity is maximum, while increasing the level of absorption produces a monotonically decreasing intensity at the output. The fraction of power not appearing at the output is transferred to the throughput port. Higher order devices are thus also switches. The three curves in this figure correspond to modulators composed of 1, 2 and 3 rings, and indicate that adding additional rings decreases the output intensity for a given absorption level. These curves are applicable to any ring modulator/switch (with knowledge of $\lambda_o$, $\Delta\lambda$ and $n_e$), and are thus universal.

Typically, the design of a specific switch or modulator follows the following steps:

(1) The optical wavelength of the light to be switched or modulated $\lambda_o$, is selected.

(2) The type of waveguiding structure used for the ring is determined. In conjunction with the wavelength this specifies $n_e$.

(3) The determined values of $\lambda_o$ and $n_e$ place a constraint on R and M through equation (1). The ring radius R is selected approximately, and then adjusted so that in conjunction with some arbitrary integer M, exactly satisfies equation (1).

(4) The highest electrical modulation frequency is selected, and this determines the minimum optical bandwidth $\Delta\lambda$. From the above determined parameters, the interaction strength $\kappa^2$ is exactly determined from equation (2). The separations between the ring and input and output waveguides are adjusted to obtain this required degree of interaction.

(5) For higher order modulators, the number of rings N is chosen. The table of FIG. 8 gives the interactions $\mu_n^2$ in terms of $\mu^2$ for each pair of rings. $\mu^2$ is determined exactly by equation (5). The interaction strength between each pair of rings $\kappa_n^2$, is determined by equation (6). The separations between each pair of rings are then adjusted so as to achieve this required degree of interaction.

Figure 10A:
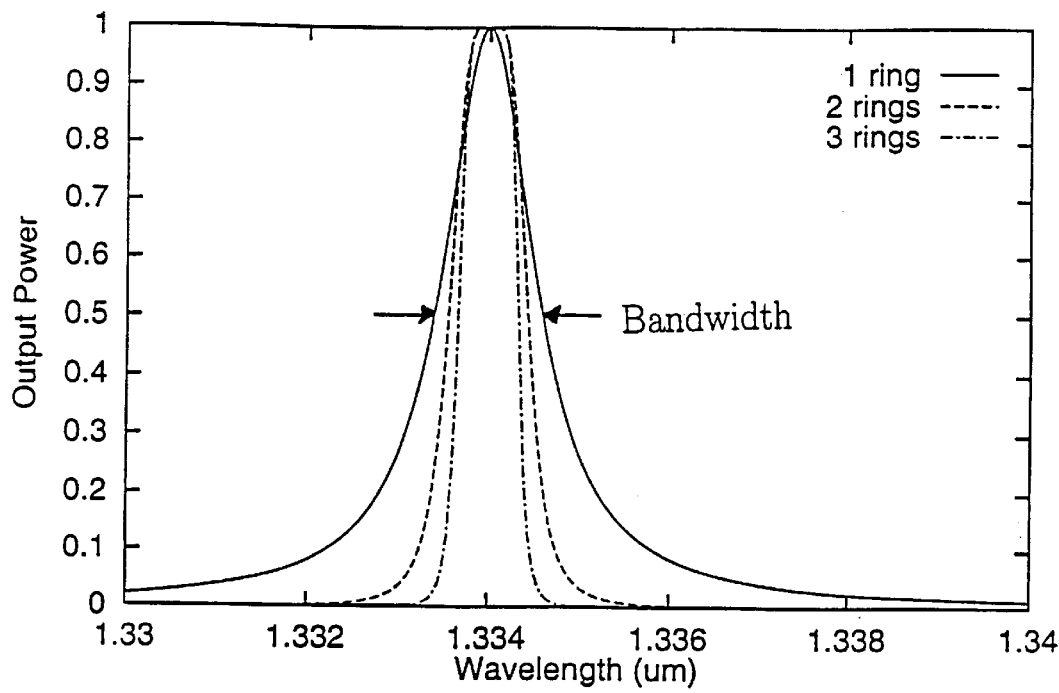
FIGS. 10A and 10B are graphs of the typical wavelength response of multiple coupled resonators around a resonant peak in linear and logarithmic scale, respectively.
Figure 10B:
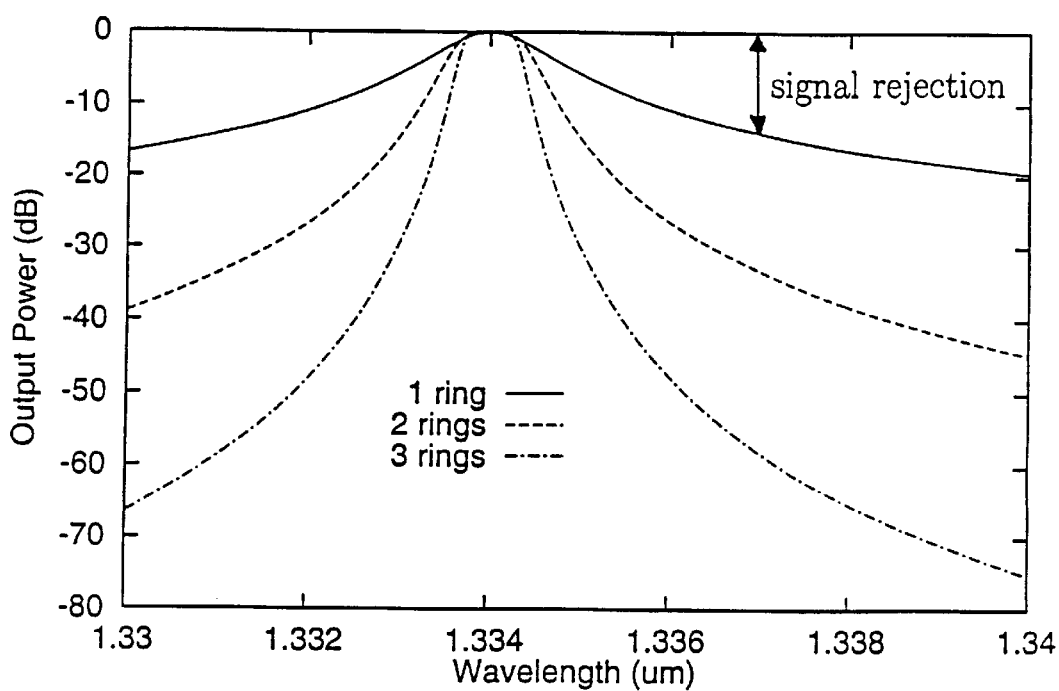

FIGS. 10A and 10B are graphs plotting the typical wavelength response of a ring resonator for 1, 2 and 3 coupled rings. Note that as the number of rings increases, the shape of the resonance becomes flat, and thus small wavelength deviations within this peak do not compromise the output intensity. FIG. 10A is a graph plotting the wavelength spectrum in linear scale, while FIG. 10B is a graph plotting the wavelength spectrum in logarithmic scale.

There has been described novel apparatus and techniques to accomplish compact, high modulation speed, high efficiency optical modulators and switches. It is evident that various changes and modifications can be made by those skilled in the art without departing from the spirit and scope of our claims. Although a circular ring structure has been preferred as the resonator, other shapes which form low loss closed loops, such as "race track" shapes, are also suitable. Although the input and output waveguides were depicted as straight sections, they may be partially curved around the ring resonators in order to increase their interaction with the ring. Although silicon is described herein as the waveguide material, various other high index materials such as Ge, GaAs, InP, GaAlAs, among others may be employed. The types of suitable materials are limited only to those which display an electro-absorption effect. Likewise, although the waveguide cladding material herein described was silicon dioxide, other low index materials, which in conjunction with the higher index waveguide forms a high index contrast, or high confinement waveguide, may be employed. Although the table of FIG. 8 gives the optimum parameters in the design of higher order modulators, small departure from these values produces only minor change in the modulation characteristics.

What is claimed is:

1. A signal modulator comprising;
    an input waveguide which carries a signal having a plurality of wavelengths including a desired wavelength;
    an output waveguide; and
    a closed loop resonator coupled between said input and output waveguides which allows transmission of said plurality of wavelengths except said desired wavelength through said input waveguide, said resonator being operable for selectively transferring said desired wavelength to said output waveguide in response to absorption characteristics of said resonator being varied.

2. The signal modulator of claim 1, wherein said signal comprises an optical signal.

3. The signal modulator of claim 1, wherein the absorption characteristics of said resonator are varied in response to an applied voltage or current to said resonator.

4. The signal modulator of claim 1, wherein said resonator has a modulation efficiency which corresponds to the spacing between said resonator and said input and output waveguides.

5. The signal modulator of claim 1, wherein said resonator comprises a ring resonator.

6. An optical signal modulator and wavelength router, comprising;
    an input waveguide having an input port and an output port, said waveguide receiving an optical signal with an incident optical wavelength at said input port;
    an output waveguide; and
    at least one closed loop resonator coupled between said input and output waveguides, said resonator being tuned into and out of resonance with said incident optical wavelength by varying absorption characteristics to selectively route said wavelength between said output waveguide and said output port.

7. The optical signal modulator and wavelength router of claim 6 further comprising a plurality of closed loop resonators coupled between said input and output waveguides, at least one of said resonators being tuned into and out of resonance with said incident optical wavelength by varying absorption characteristics to selectively route said wavelength between said output waveguide and said output port.

8. The optical signal modulator and wavelength router of claim 6, wherein the absorption characteristics of said at least one resonator is varied in response to an applied voltage or current to said resonator.

9. The optical signal modulator and wavelength router of claim 6, wherein said at least one resonator has a modulation efficiency which corresponds to the spacing between said resonator and said input and output waveguides.

10. The optical signal modulator and wavelength router of claim 6, wherein said at least one resonator comprises a ring resonator.

11. An optical signal modulator and wavelength router, comprising;
    an input waveguide having an input port and an output port, said waveguide receiving an optical signal with an incident optical wavelength at said input port;
    an output waveguide;
    at least one closed loop resonator coupled between said input and output waveguides, said at least one resonator being operable for selectively routing said incident wavelength between said output waveguide and said output port in response to being tuned into and out of resonance with said incident optical wavelength; and
    means for tuning said at least one resonator into and out of resonance with said incident optical wavelength by inducing absorption in said at least one resonator.

12. The optical signal modulator and wavelength router of claim 11 further comprising a plurality of closed loop resonators coupled between said input and output waveguides, at least one of said resonators being tuned into and out of resonance with said incident optical wavelength by varying absorption characteristics to selectively route said wavelength between said output waveguide and said output port.

13. The optical signal modulator and wavelength router of claim 11, wherein the absorption characteristics of said at least one resonator is varied in response to said tuning means applying voltage or current to said at least one resonator.

14. The optical signal modulator and wavelength router of claim 11, wherein said at least one resonator has a modulation efficiency which corresponds to the spacing between said resonator and said input and output waveguides.

15. The optical signal modulator and wavelength router of claim 11, wherein said at least one resonator comprises a ring resonator.

16. A method of modulating an optical signal, comprising;
    transmitting an optical signal with a plurality of incident optical wavelengths including a desired wavelength through an input waveguide; and
    tuning at least one closed loop resonator, coupled between said input waveguide and an output waveguide, into and out of resonance with said desired wavelength by inducing absorption in said at least one resonator to selectively switch said desired wavelength to said output waveguide while allowing transmission of remaining wavelengths through said input waveguide.

17. The method of claim 16, wherein said tuning step comprises applying a voltage or current to said resonator to induce absorption in said resonator.

18. The method of claim 16, wherein said resonator has a modulation efficiency which corresponds to the spacing between said resonator and said input and output waveguides.

19. The method of claim 16, wherein said resonator comprises a ring resonator.

20. The method of claim 16 further comprising tuning a plurality of closed loop resonators, coupled between said input waveguide and an output waveguide, into and out of resonance with said desired wavelength.

* * * * *